United States Patent [19]

Kornfeldt et al.

[11] Patent Number: 5,247,960
[45] Date of Patent: Sep. 28, 1993

[54] REPLACEMENT VALVE SEAT DEVICE WITH EXPANDABLE RING

[75] Inventors: Hans Kornfeldt; Lars-Ake Körnvik; Lars Törnblom, all of Västerås, Sweden

[73] Assignee: ABB Atom AB, Västerås, Sweden

[21] Appl. No.: 858,938

[22] Filed: Mar. 27, 1992

[30] Foreign Application Priority Data

Apr. 24, 1991 [SE] Sweden ............................ 9101233

[51] Int. Cl.$^5$ .......................................... F16K 43/00
[52] U.S. Cl. .................................. 137/315; 251/360; 251/363
[58] Field of Search ............... 137/315; 251/359, 360, 251/363, 364; 29/890.121

[56] References Cited

U.S. PATENT DOCUMENTS

| 606,867 | 7/1898 | Hoover | 251/360 |
|---|---|---|---|
| 1,586,346 | 5/1926 | Wilson | 251/363 |
| 2,101,970 | 12/1937 | Wissler | 251/359 |
| 2,585,658 | 2/1952 | Keller | 251/363 |
| 2,631,577 | 3/1953 | Carter | 251/363 |
| 2,666,614 | 1/1954 | Grove et al. | 251/363 |
| 2,731,036 | 1/1956 | Hughes | 251/363 |
| 3,487,823 | 1/1970 | Tarter et al. | 251/359 |
| 3,913,887 | 10/1975 | Siepmann | 251/359 |
| 4,739,792 | 4/1988 | Tornberg | 137/315 |

FOREIGN PATENT DOCUMENTS 835448  3/1952  Fed. Rep. of Germany ...... 251/363

Primary Examiner—George L. Walton
Attorney, Agent, or Firm—Watson, Cole, Grindle & Watson

[57] ABSTRACT

A replacement valve seat device for insertion in a recess of a valve where a valve seat has been removed includes a first ring which provides a valve seat and a cooperating second ring of memory metal which is expandable upon being heated above its transistion temperature to fixedly position the first ring in position within the recess.

5 Claims, 3 Drawing Sheets

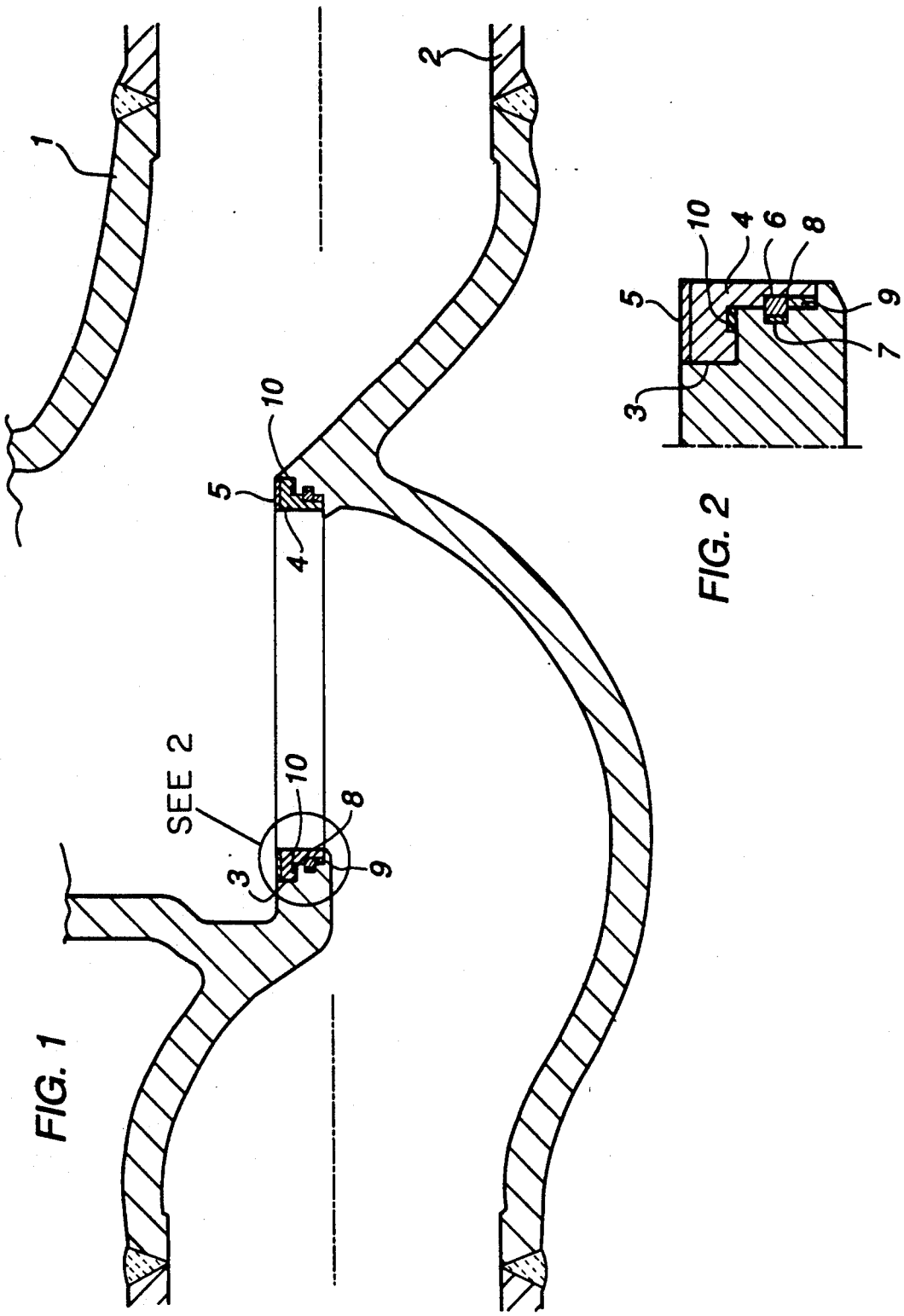

REPLACEMENT VALVE SEAT DEVICE WITH EXPANDABLE RING

BACKGROUND AND SUMMARY OF THE INVENTION

During repair or redesign of valves, especially large valves in nuclear power plants, a normal method may comprise machining of the old valve seat, welding of new seat material and machining of the welded-on material into the desired geometry for the new valve seat. This can be done either on a cut-off valve in a workshop, or in situ in the pipeline. This entails extensive work. The present invention relates to a device by means of which this work is considerably simplified.

The device comprises a prefabricated annular first valve seat provided with a supporting ring with an outer surface. The first valve seat is intended to replace a second valve seat, removed from the valve to be repaired, by fitting the supporting ring into a recess at the place of the second valve seat in the valve. According to the invention, the supporting ring is combined with a ring of memory metal which is adapted, with the supporting ring in position in the recess, upon heating above the transition temperature of the memory metal with ensuing deformation of the ring, to fix the supporting ring in the recess by expansion either in a space around the supporting ring between its outer surface and the inner surface of the recess, or inside the supporting ring towards the inner surface thereof such that at least part of the outer surface of the supporting ring is sealingly pressed against the inner surface of the recess.

The device permits work with repair or redesign of a valve without extensive welding operations carried out in situ in the pipeline in which the valve is positioned. The old second valve seat is removed in a suitable way and a recess for the new first valve seat is machined into the desired shape. The new valve seat combined with a ring of memory metal is placed in the recess and the ring of memory metal is heated in a suitable way above the transition temperature of the memory metal. The ring of memory metal shall then, below the transition temperature, have been deformed into such a shape that the combined device of the first valve seat and the ring of memory metal can be inserted without difficulty into the recess. Above the transition temperature, however, the ring shall have such a shape that it fixes the valve seat into the recess in a reliable manner. This can be done, for example, by the ring being deformed into a smaller diameter below the transition temperature than it has above the transition temperature. It should perhaps be noted that a memory metal is an alloy which may occur in a stable austenitic phase at a temperature above a certain so-called transition temperature and a stable martensitic phase below that temperature. A memory metal, which in the austenitic phase has been given a certain first shape and is then cooled down below the transition temperature to martensitic phase and thereafter deformed into a second shape, has the ability, after heating above the transition temperature to austenitic phase, to resume its first shape, that is, to remember that shape. Certain memory metals have the ability to change their shapes each time the transition temperature is passed. They have a so-called two-way memory effect. In this case, however, it is desirable for the memory metal to be of a so-called one-way type.

This means that the above-mentioned ring of memory metal is given the desired final shape in austenitic phase. Thereafter, it is cooled down below the transition temperature to martensitic phase and deformed into a shape suitable for the mounting of the device in position in the valve. After heating above the transition temperature to austenitic phase, it assumes or attempts to assume the original shape and then maintains this shape even if the temperature should again drop below the transition temperature.

BRIEF DESCRIPTION OF THE DRAWINGS

The invention will be most readily understood with reference to the accompanying drawings, wherein FIG. 1 shows a section of a first valve seat which has been fixed by a locking ring of memory metal, FIG. 2 shows a feature of FIG. 1.

DETAILED DESCRIPTION OF THE PREFERRED EMBODIMENTS

Figure 3:
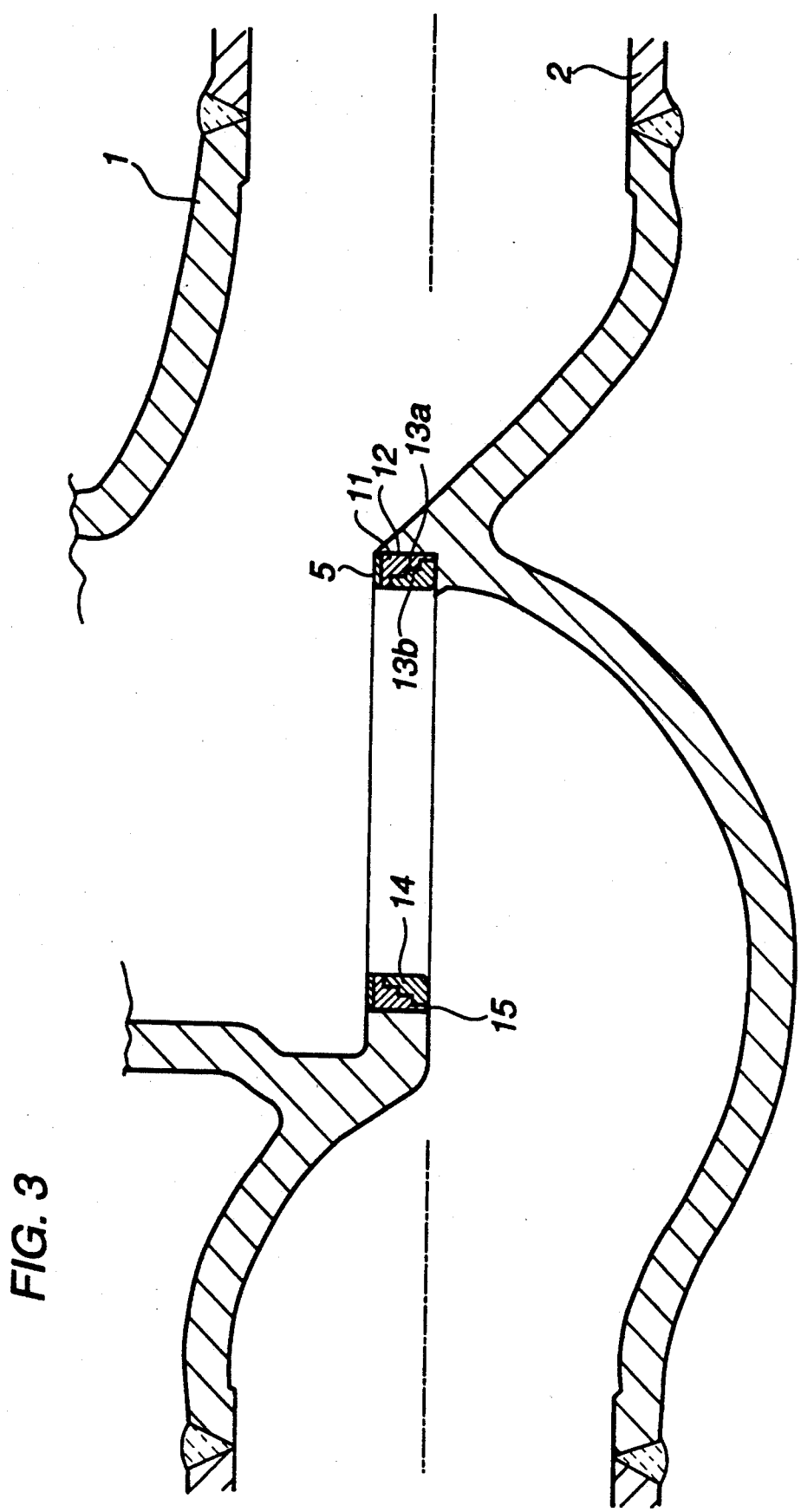
FIG. 3 shows a section of a first valve seat which has been fixed by an expansion ring of memory metal.

In FIG. 1, 1 designates a valve which is welded into a pipeline 2. In the valve 1 the old second valve seat has been cut away and a recess 3 been prepared for the device according to the invention. The device comprises a supporting ring 4 which is provided at the top with a part of hardened metal. This part forms the first valve seat 5 which is to replace the old valve seat. The hardened part can be obtained by pressing metal powder under high pressure and will then constitute an integral part of the supporting ring 4 (the HIP method). This manufacture is performed with great precision and the valve seat 5 requires no subsequent treatment.

As will be clear from FIG. 2, the supporting ring 4 is provided with a first slot 6 and the recess 3 with a corresponding second slot 7. A locking ring 8 of memory metal, which may be divided such that it may be opened and fitted over the supporting ring 4 into the slot 6, is placed in the first slot 6. Another possibility is that the locking ring 8 is completely closed, the slot 6 then having to be opened downwards by means of a ring 9 provided with internal threads. When this ring is threaded off the supporting ring 4, the locking ring 8 is fitted onto the supporting ring 4 and then locked in position by threading the ring 9 onto the supporting ring 4 again.

In FIG. 2, the locking ring 8 of memory metal has been heated above the transition temperature of the memory metal such that it has expanded to its original shape and entered the second slot 7, hence fixing the first valve seat 5 in position in the valve 1. Below the transition temperature, the locking ring 8 is deformed such that the supporting ring including the locking ring 8 can be freely inserted into the recess 3. To ensure that sealing is obtained between the recess 3 and the supporting ring 4, a sealing ring 10 has been arranged in an extra slot in the supporting ring 4.

FIG. 3 shows another possible embodiment of the invention. In this figure, 11 designates an outer ring of steel which is provided, in the same way as the supporting ring 4, with a first valve seat 5 of hardened metal. The outer ring 11 is provided with a substantially cylindrical outer surface fitting into a cylindrical recess 12 provided at the place of the old second valve seat. The outer ring 11 has been provided with a stepped inner surface 13a. An expansion ring 14 of memory metal provided with a similarly stepped outer surface 13b is arranged inside the outer ring 11. This expansion ring 14 is intended, with the device in position in the recess 12, upon heating above the transition temperature of the memory metal, to expand to such an extent that the surrounding outer ring 11 is sealingly pressed into the recess 12. By the stepped shape of the outer ring 11, a narrow sealing lip 15 is obtained which is influenced by the expansion ring 14 where this is thickest. This means that especially the sealing lip 15 will press with great force against the wall of the recess 12.

Figure 4:
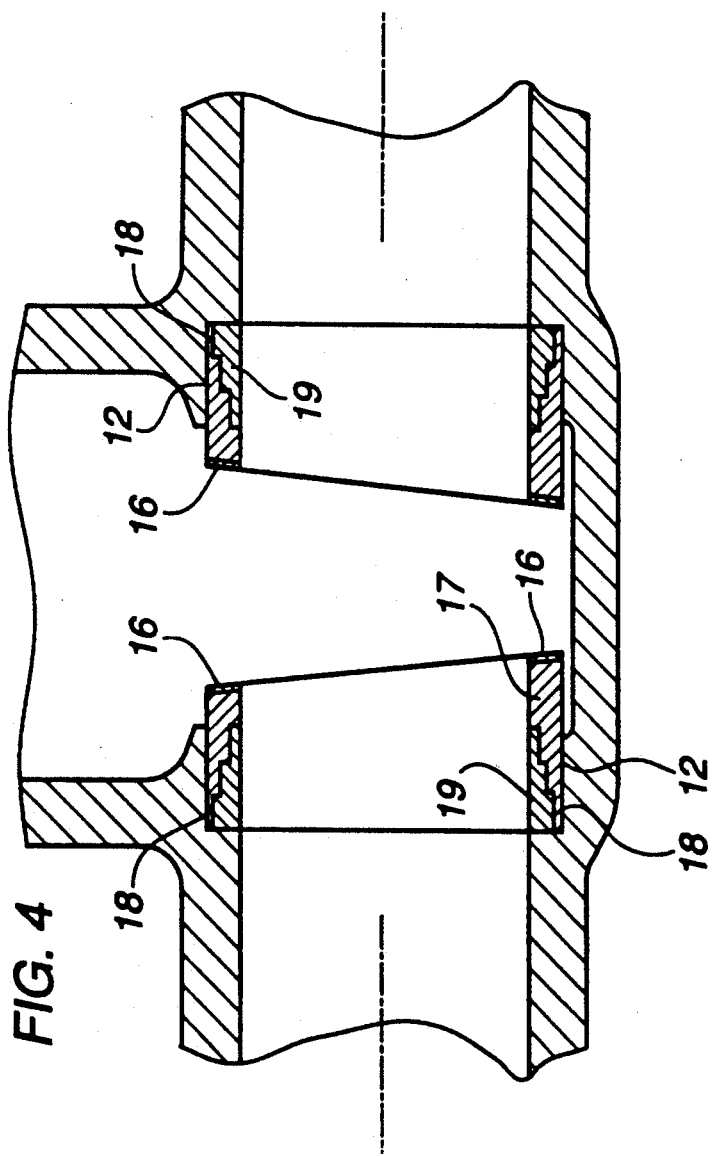
FIG. 4 shows a wedge-type sliding valve, the two valve seats of which have been fixed in similar manner by expansion rings of memory metal.

FIG. 4 shows a wedge-type sliding valve, the old valve seats of which on both sides of the wedge-shaped slide head (not shown) have been replaced by new annular, first valve seats 16, each of which being supported by a tubular outer ring 17 of steel. Part of the inner surface of this outer ring 17 is stepped such that a sealing lip 18 is formed. Inside the outer ring 17 an expansion ring 19 of memory metal is arranged. The expansion ring 19 has a similarly stepped outer surface and the device functions upon heating of the expansion ring 19 above the transition temperature of the memory metal in exactly the same way as described for FIG. 3.

Figure 5:
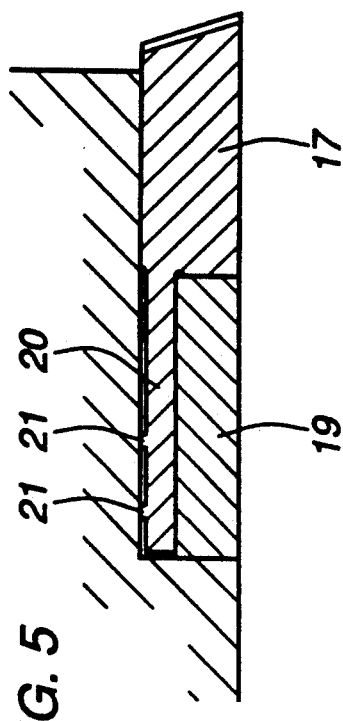
FIG. 5 shows an alternative location of the expansion ring.

FIG. 5 shows a alternative location of the expansion ring 19 inside the outer ring 11, 17. Here the stepped shape is replaced by a sealing lip 20 of even thickness which is provided with a number of sealing strips 21. Upon expansion of the expansion ring 19 when the temperature increases above the transition temperature, these strips are sealingly pressed into the base.

I claim:

1. The combination of a valve providing a recess having an inner surface and a replacement valve seat device for use in said recess, said replacement valve seat device comprising a supporting ring that defines a valve seat, an outer surface and a first slot in said outer surface; and a locking ring made of a memory metal positioned within said first slot, said replacement valve seat device being freely positionable within said recess and said locking ring being expandable when heated to a temperature above a transition temperature thereof to transform into a shape that will extend out of said first slot and beyond said outer surface of said supporting ring and towards said inner surface of said recess to fixedly position and maintain said supporting ring within said recess.

2. The combination according to claim 1, wherein said valve provides a second slot in said inner surface of said recess, and wherein said locking ring is expandable into said second slot to fixedly position and maintain said supporting ring in position within said recess.

3. The combination according to claim 1, wherein said supporting ring is made of steel.

4. The combination of a valve providing a recess having an inner surface and a replacement valve seat device for use with said valve, said replacement valve seat device comprising an outer ring that defines a valve seat and an inner expansion ring made of a memory metal positioned within the outer ring, said replacement valve seat device being freely positionable within said recess and said expansion ring being expandable with heating to a temperature above a transition temperature thereof to expand said outer ring and sealingly press said outer ring into engagement with the inner surface of said recess.

5. The combination according to claim 4, wherein said outer ring defines a stepped cylindrical inner surface and wherein said expansion ring defines a correspondingly stepped cylindrical outer surface.

* * * * *